United States Patent [19]

Riesner et al.

[11] Patent Number: 4,699,717
[45] Date of Patent: Oct. 13, 1987

[54] CHROMATOGRAPHIC PROCESS FOR THE SEPARATION OF NUCLEIC ACIDS

[76] Inventors: Detlev Riesner, Eichenwand 15, 4000 Dusseldorf 12; Metin Colpan, Christoph-Strasse 67, 4000 Dusseldorf 1, both of Fed. Rep. of Germany

[21] Appl. No.: 830,708

[22] Filed: Feb. 14, 1986

Related U.S. Application Data

[63] Continuation-in-part of Ser. No. 560,931, filed on Mar. 25, 1983, published as WO83/03363 on Oct. 13, 1983, abandoned.

[30] Foreign Application Priority Data

Mar. 26, 1982 [DE] Fed. Rep. of Germany ....... 3211309

[51] Int. Cl.$^4$ ............................................ B01D 15/08
[52] U.S. Cl. ................................... 210/635; 210/656; 210/198.2; 210/502.1; 502/401; 502/439; 514/44; 536/27
[58] Field of Search ............ 210/635, 656, 659, 198.1, 210/502.1; 514/44; 536/27; 502/401, 402, 439

[56] References Cited

U.S. PATENT DOCUMENTS

| 4,029,583 | 6/1977 | Chang | 210/198.2 |
| 4,118,316 | 10/1978 | Tallet et al. | 210/656 |
| 4,140,653 | 2/1979 | Inmura et al. | 252/430 |
| 4,290,892 | 9/1981 | Abbott | 210/656 |
| 4,406,792 | 9/1983 | Glad | 210/656 |
| 4,447,328 | 5/1984 | Kamithma et al. | 210/656 |

FOREIGN PATENT DOCUMENTS 2601930 7/1977 Fed. Rep. of Germany .
2462183 2/1981 France .
2075362 11/1981 United Kingdom .

Primary Examiner—Ernest G. Therkorn
Attorney, Agent, or Firm—Hayes, Davis & Soloway

[57] ABSTRACT

A process for the chromatographic separation of nucleic acid using a chromatographic carrier material is described in which the surface of the carrier material is specially modified.

13 Claims, 8 Drawing Figures

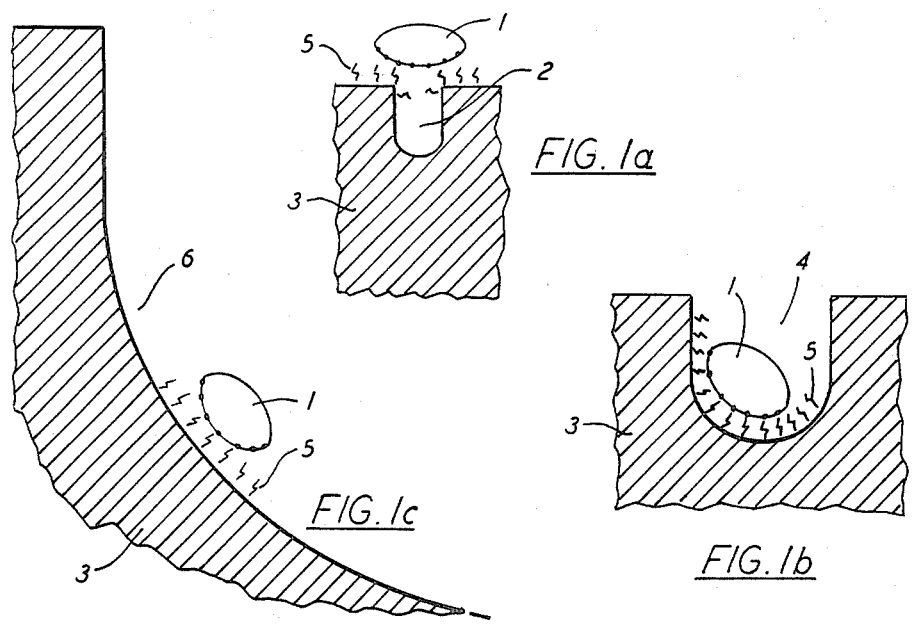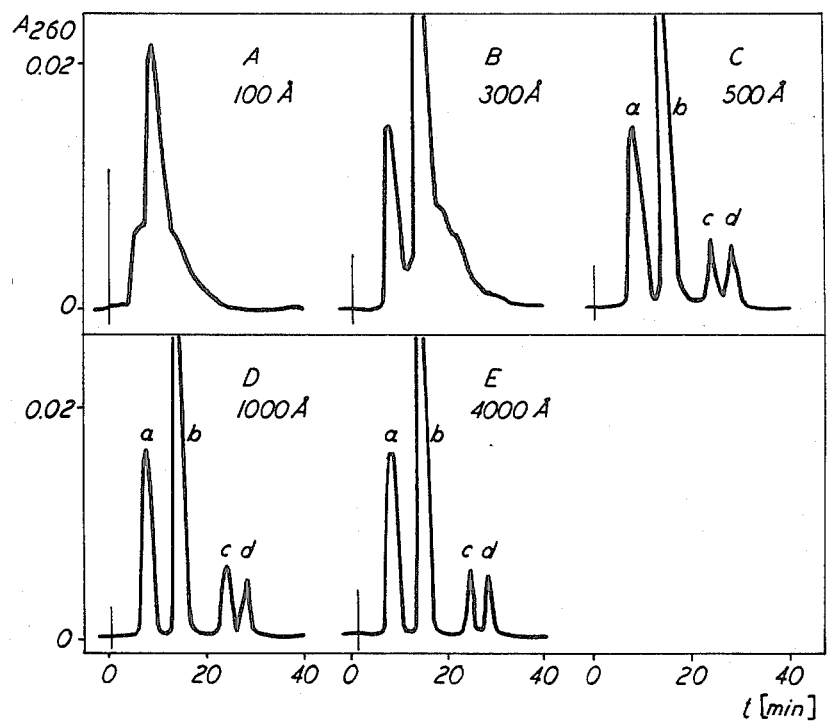
FIG. 1a
FIG. 1b
FIG. 1c
FIG. 2

CHROMATOGRAPHIC PROCESS FOR THE SEPARATION OF NUCLEIC ACIDS

This application is a continuation-in-part application of our copending application Ser. No. 560,931 filed Mar. 25, 1983, published as WO83/03363 on Oct. 13, 1983, now abandoned.

The invention concerns a chromatographic process for separating natural and synthetic nucleic acids from low to very high molecular weight (molecular weight up to $50 \times 10^6$) by using surface modified carrier materials that contain cavities, and in particular to the chromatographic separation of nucleic acids having a chain length from about 5 to about 5000 nucleotides, natural and synthetic ribonucleic acids having one or two strands (RNA), like transfer RNA, ribosomal RNA, messenger RNA and viral RNA, natural desoxyribonucleic acid (DNA) and DNA fragments, particularly plasmid DNA and phagene DNA by using such carrier materials.

The progress in biochemistry, molecular biology and genetic engineering, and the application thereof to medicine, pharmacology and agriculture requires the quick separation and purification of discrete nucleic acids species. Thus, for instance, there often arises in genetic engineering the problem that from a naturally occurring mixture of 100 and more different nucleic acids of high molecular weight, a single molecular species must be purified homogeneity. The individual nucleic acids are known to be characterized by nucleotide sequence, molecular weight, size and shape.

Of special interest are long-chain ribo- and deoxyribo-oligonucleotides, natural ribonucleic acids (RNA), like transfer RNA and 7S RNA, viral RNA and messenger RNA, deoxyribonucleic acids (DNA), DNA fragments and plasmid DNA.

Traditional techniques force scientists to choose between resolution and recovery and are time consuming often hours or days to complete. Separation of high molecular weight nucleic acids is often done by gel electrophoresis or ultracentrifugation in CsCl density gradients. The high resolution of gel electrophoresis is very favorable but the recovery of the purified samples is low and the quality is often diminished because of contaminations with the gel matrix (soluble oligomeric agarose or acrylamide) yielding an inefficient biological activity in cell transformation and enzymatic reactions, e.g. digestion with restriction endonucleases, ligation, and reverse transcription. In addition electrophoresis is time consuming requiring hours or days to complete. Although for the special case of plasmid preparation banding in CsCl density gradients may be performed, it requires prolonged ultracentrifugation at high speed and consumes large amounts of CsCl and has the disadvantage of being expensive in respect to CsCl and service cost for the ultracentrifuge.

Chromatographic processes have proved advantageous for many separation problems in organic chemistry. High-performance liquid chromatography (HPLC) offers the most advantages in relation to resolution, short consumption of time and reproducibility. Said process has hitherto been used in the form of gel permeation chromatography (GPC), ion-exchange chromatography and reversed-phase chromatography (RP chromatography). However, for the separation of nucleic acids, these processes had the following disadvantages:

GPC is able only to separate small from very large molecules and resolution decreases above molecular weights of about 250,000, i.e. about 350 basepairs DNA.

The prior art ion exchangers and reversed-phase chromatography resins could only be used with high resolution for small molecules such as oligonucleotides, e.g. chain length up to 15 nucleotides (Fritz et al.; Biochemistry (1978) 17, 1257–1267). In the separation of nucleic acids of high molecular weight such as long-chain ribo- and deoxyribo-oligonucleotides, natural RNA's, like transfer RNA and 7S RNA, viral RNA and messenger RNA, DNA, DNA fragments and plasmid DNA, the required resolution into individual nucleic acid species could not be obtained.

Although hydrophobic-ionic RPC-5 chromatography material such as described by Larson, J. E. et al (The Journal of Biological Chemistry (1979) 254, 5535–5541) had been successfully used in the separation of DNA fragments, the flow rates that is, very long durations of chromatography, and the low chromatographic stability of the RPC-5 material are of great disadvantage. Due to the chemical properties of the RPC-5 material, bleeding of the liquid ion-exchanger Adogen 464 occurs, contaminating the purified samples.

With prior art chromatography, it was not possible to separate or isolate into the individual molecular species complex nucleic acid mixtures, with high resolution and high velocity, or to analyze said mixtures. It is thus an object of the present invention to provide a chromatographic process, wherewith the above-mentioned disadvantages are eliminated. Yet another object of the present invention is to provide in a single run the separation into their components, with very high resolution and high velocities, of macromolecular mixtures of the most varied kinds, which contain components of very different dimensions, for example, in the range of 30 Angstroms to 1,000 Angstroms. Still another object of the invention is to provide separation materials suitable for employment at high flow rates, wide temperature ranges and with extended durability. A high loading capacity is desirable with the nucleic acid mixtures to be separated. Contrary to the contraindications of the prior art, the present invention provides a chromatographic resin, with which it is possible to separate in a chromatographic process complex nucleic acid mixtures having a very broad spectrum of molecular size at very high resolution.

Because of its simplicity and the stable resin, this process is suitable for routine use in industry and research.

More particularly, the present invention provides the surface modification of a carrier material of a chromatographic resin, for the chromatographic separation of nucleic acids, using an inert particle, preferably silica gel. This silica gel is a high performance liquid chromatography silica gel, and preferably has a particle size of about 2 to 100 microns. A suitable, commercially available silica gel for this purpose is 10 micron LiChrosphere SI 4000 sold by E. Merck, Germany. However, the silica gel may be any chromatographic grade silica gel.

In the initial step, the silica is reacted with a bifunctional silane, e.g. γ-glycido-oxypropyl-trimethoxysilane in toluene. The reaction is conducted for a time and at a temperature to produce a product comprising γ-glycido-oxypropyl-trimethoxysilane covalently bound to the silica. An excess of γ-glycido-oxypropyl-trimethoxysilane to reactive silanol sites on the silica is used, a 5-fold excess being preferred. After reaction, the product epoxy-silica is filtered through a glass filter funnel yielding a filter cake. The filter cake is washed with hexane, dioxane and methanol to remove the silane and soluble impurities. Then the epoxy-silica is dried in vacuo. In the next step, if for example, the surface is modified into an anion-exchanger, the epoxy-silica is reacted with a N,N-dialkylalcohol, e.g. N,N-diethylethanol in toluene. After reaction, the resulting anion-exchanger diethylaminosilica gel (DEAE-silica) is removed by suction through a glass filter funnel and washed with methanol, acetone and ether and dried in vacuo.

For chromatography of nucleic acids the resulting chromatographic resin is dispersed in methanol and fed under pressure into a stainless steel column (diameter 6 mm, length 125 mm) at a flow-rate of 5 ml/min with a high-pressure pump with methanol as an eluent. The packed column is washed with water and connected to a liquid chromatograph (DuPont LC 850) equipped with an UV-detector. The separation is carried out with a gradient elution of increasing ionic strength in aqueous buffers at pH between 4 to 8. With this chromatographic resin water soluble nucleic acids can be separated conveniently and rapidly with high resolution.

The process described according to the invention is the first chromatographic process that has the following properties:

1. General applicability to the separation of nucleic acids.
2. Short chromatographic periods and high reproducibility of the elution profiles by the use of pressure-stable resins in HPLC equipments.
3. High loading capacity.
4. Chromatographic materials having long-term stability (no "bleeding" of the chromatography columns).

Unlike prior art chromatographic resins, which were exclusively based on the chemical properties of the carrier materials, the point of departure of the instant invention is the finding that the size and/or the shape of the cavities of the resin is of quite essential importance for the separation and must be in a specific relationship to the size of the nucleic acid species to be isolated. It has been found that the size of the cavities must amount to 1 to 40 times that of the components to be isolated. If the dimensions of the individual components to be separated differ from each other by more than a factor 40, it is possible to carry out the separation in several steps using carrier materials having suitably sized cavities. According to a preferred embodiment of the invention, there is provided a suitable modification of the surface. It has proved very advantageous here that the groups responsible for the interaction with the substances to be separated have been anchored to the surface by flexible chain molecules. This effect is obtained, for instance, by using γ-glycido-oxypropyl-trimethoxysilane. As interaction-producing groups there are contemplated strongly and weakly basic anion exhangers, strongly and weakly acidic cation exchangers, groups having hydrophobic interactions, groups having polarization interactions, and groups that combine several of the aforementioned properties. Since it has been found that in many applications bivalent metal ions can give rise for considerable hindrances, it has further been proposed according to the invention that all parts that come in contact with the solvents consist of noble metal, glass or plastic, or have adequate coatings of noble metal, glass or plastic.

More particularly, in accordance with a preferred embodiment of the invention, there is provided a process for the chromatographic separation of nucleic acids using a chromatographic carrier prepared by reacting a carrier material that contains cavities and has a grain size of from 2 to 100 μm, a cavity size of from 10 to 4000 nm and a specific surface of from 5 to 800 m$^2$/g with a silanization reagent of the general formula $$R_1R_2R_3SiR_4 \qquad \text{I.}$$

wherein $R_1$ corresponds to one alkoxy radical having from 1 to 10 C atoms, preferably —OCH$_3$, —OC$_2$H$_5$ or —OC$_3$H$_7$, or one halogen atom, preferably —Cl, or one dialkyl amino group with identical or different alkyl radicals having from 1 to 6 C atoms, $R_2$ and $R_3$ correspond to a hydrocarbon radical having from 1 to 10 C atoms, preferably —CH$_3$, —C$_2$H$_5$ or C$_3$H$_7$, or an alkoxy radical having from 1 to 10 C atoms, preferably —OCH$_3$, —OC$_2$H$_5$ or —OC$_3$H$_7$, or one halogen atom or one alkyl radical having from 4 to 20 C atoms interrupted by at least one oxy or amino group, wherein said radical can also be replaced once or more by halogen, cyano, nitro, amino, monoalkylamino, dialkylamino, hydroxy or aryl, and $R_4$ corresponds to a hydrocarbon chain having from 1 to 20 C atoms or an alkyl radical interrupted by at least one oxy or amino group, wherein said radical can also be replaced once or more by halogen, cyano, nitro, amino, monoalkylamino, dialkylamino, alkoxy, hydroxy, aryl and/or epoxy, preferably

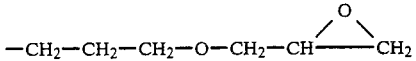

and then, to form the final carrier, reacting the carrier containing said cavities with a reagent of the general formula $$X\text{-}R\text{-}Y \qquad \text{II}$$

wherein X is an amino, hydroxy, epoxy group or one halogen atom, R is a hydrocarbon chain having from 2 to 20 C atoms, or an alkyl radical interrupted by at least one oxy or amino group, wherein said radical can also be replaced once or more by halogen, cyano, nitro, amino, monoalkylamino, dialkylamino, alkoxy, hydroxy, aryl and/or epoxy and Y is a hydrocarbon radical having from 1 to 10 C atoms and functional groups that form anion or cation exchangers, wherein said radical can be replaced once or more by amino, monoalkylamino, dialkylamino, quaternary alkylamino, carboxyl, boric acid, alkyl and aryl sulfonic acid groups, wherein the diameter of the cavities amounts to from 1 to 40 times, more preferably 1 to 20 times the maximum dimension of the respective nucleic acid to be isolated or the maximum dimension of the largest of all nucleic acids contained in the mixture.

In a particularly preferred embodiment of the invention, the carrier material used has a cavity size of from 50 to 1000 nm and a specific surface of at most 200 m$^2$/g. Preferably silicon dioxide is used as carrier material. In one preferred embodiment of the invention, the cavities are formed by semispherical recesses; in another preferred embodiment the cavities are tubular. Preferably the solution containing nucleic acids to be separated and the elution substance are kept free from bivalent metal ions by using noble metal, glass and/or plastic for columns, pipes, valves and pumps of the chromatographic equipment.

BRIEF DESCRIPTION OF THE DRAWING

The invention is explained in more detail with reference to the figures, which show:

FIGS. 1A, 1B, and 1C show segments and cross sections through carrier materials of different cavity sizes; and FIGS. 2, 3, 4, 5 and 6 are graphic illustrations of separations profiles obtained in accordance with the present invention.

DESCRIPTION OF THE PREFERRED EMBODIMENTS

Figure 3:
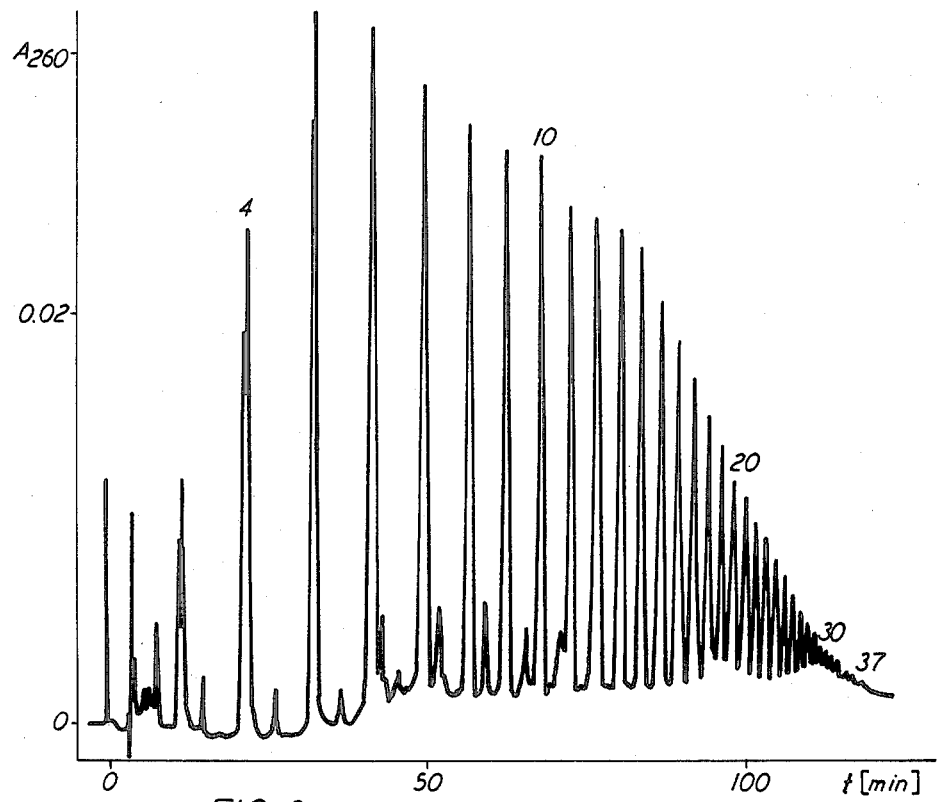

The invention is explained in more detail in the following examples:

EXAMPLE 1

A weak anion exchanger according to the present invention was synthesized by the following process:

Commercial 50 g LiChrosphere SI 4000 silica gel particles (E. Merck, Darmstadt, Germany) with a partical size of 10 μm and a poresize of 4000 Angstroms is activated in a 1000 ml three-necked flask at a pressure of <1 mbar for 24 hours at the temperature of 200° C. After cooling, it was aerated with dry nitrogen and suspended in 100 ml dry γ-glycidooxypropyl-trimethoxysilane in 500 ml dry toluene and 1 ml tributylamine. The reaction took place for 10 hours reflux under a nitrogen atmosphere and with continuous stirring at 400 rpm. After the reaction, the excess γ-glycidooxypropyl-trimethoxysilane and toluene were removed by suction and the product epoxy-silica was washed four times with 400 ml dry hexane and two times 400 ml dry ether and dried in vacuo. With a four-necked flask including an inner thermometer, return-flow cooler, stirrer and nitrogen inlet pipe, the epoxy-silica gel was reacted with 100 ml dry N,N-diethyl-aminoethanol in 400 ml toluene. The reaction was catalyzed by addition of 1 ml $BF_3$/ether and boiled for 12 hours under reflux. After reaction, the final chromatographic resin dimethylamino-silica gel (DEAE-Silica) was removed by suction and washed two times with 400 ml dioxane, 400 ml methanol and 200 ml ether, and dried at 50° C. in vacuo. The yield amounted to 51.5 g.

For column packing 3 g of the resulting chromatographic resin was dispersed in 50 ml methanol and was fed under pressure into a stainless steel column (diameter 6 mm, length 125 mm) connected to a 50 ml packing reservoir at a flow-rate of 5 ml/min with a high-pressure pump with methanol as an eluent. The packed column was disconnected from the packing reservoir, washed with methanol and water and connected to a liquid chromatograph (DuPont LC 850) equipped with a UV-detector. The separation is carried out with a gradient elution of increasing KCl concentration in 5 M urea, 30 mM potassium-phosphate buffer, pH 6.5

EXAMPLE 2—EFFECT OF PORE SIZE

The effect of the cavity size of the chromatographic resin on the interaction with the macromolecule is explained with reference to FIG. 1. A macromolecule (1) cannot sufficiently penetrate in the too small cavity (2) of the carrier material (3) in order to enter into an optimal interaction. On the other hand, the cavity (4) of more favorable dimensions permits very intensive interactions. To increase the interactions, the interaction producing groups are anchored on the cavity surface by flexible chain molecules (5). If on the contrary the cavity (6) is too large, then a reduction in interaction is again to be expected.

Figure 4:
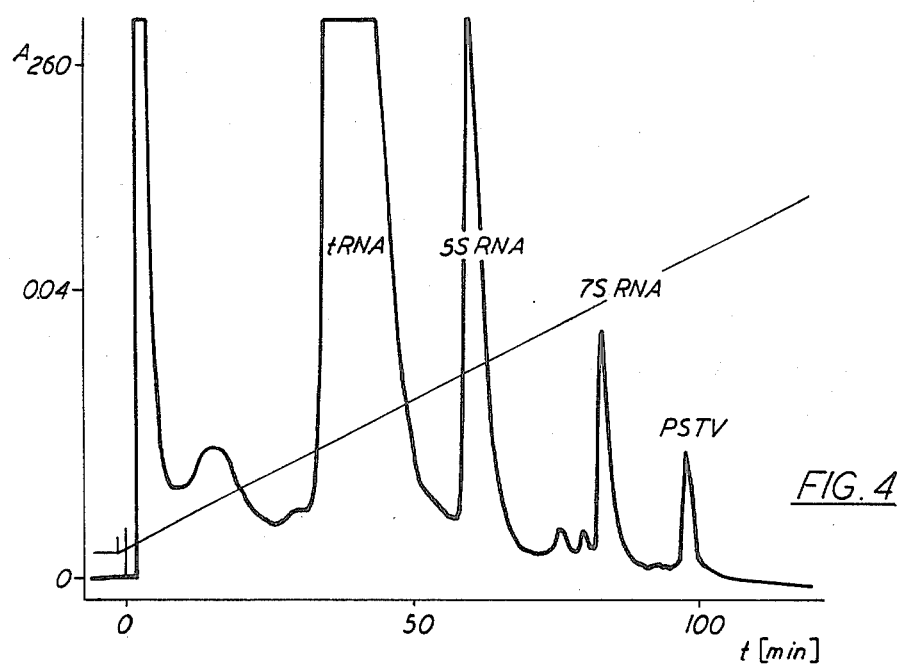

In FIG. 2 are illustrated separation examples of long-chain nucleic acids. The cavity diameters are - as indicated in the drawing—100 Angstroms, 300 Angstroms, 500 Angstroms and 4000 Angstroms. As example for a separation of long-chain nucleic acids, there was selected a natural mixture of transfer RNA (80 Angstroms size), ribosomal 5S RNA (110 Angstromes size), 7S RNA (300 Angstroms size) and viroid RNA (450 Angstroms size, a plant pathogene infectious RNA). It can be clearly seen in FIG. 2 that the largest pore size selected gave the best separation, and it is not to be ruled out that with a cavity size between 1000 Angstroms and 4000 Angstroms a still better separation would be obtained. In FIG. 4 the example from FIG. 2 has been further optimized by a shallower gradient elution. A complete separation of all four components is obtained. The diethylamino silica gels used in the examples had the loading capacity of 4.8 mg nucleic acid mixture/g (100 Angstroms), 17 mg nucleic acid mixture/g (500 Angstroms) and 5.6 mg nucleic acid mixture/g (4000 Angstroms).

EXAMPLE 3—SEPARATION OF OLIGORIBONUCLEIC ACIDS

Oligo-ribo-adenylic acids with chain lengths from 3 to 40 nucleotides were chromatographically purified using the anion-exchange resin obtained in Example 1 (FIG. 3). Synthetic oligonucleotides of defined length and sequence are required for modern genetic engineering and molecular biology.

Column: 6 mm × 125 mm stainless steel, elution with a linear gradient from 0 to 1 M KCl in 200 min, in 5 M urea, 30 mM potassium-phosphate buffer, pH 5.5, at a flow rate of 1 ml/min, 35 bar, 22° C.

EXAMPLE 4—VIROID RNA

Viroid RNA (PSTV) from total RNa from infected plants was chromatographically purified using the anion-exchange resin obtained in Example 1 (FIG. 4). The purified nucleic acid was pure to spectroscopic, hydrodynamic and thermodynamic properties and was fully active in enzymatic experiments.

Column: 6 mm × 125 mm stainless steel, elution with a linear gradient from 250 mM to 1000 mM KCl in 200 min, in 5 M urea, 30 mM potassium-phosphate buffer, pH 6.5, flow rate 1.5 ml/min, 45 bar, 22° C.

EXAMPLE 5—DNA-RESTRICTION FRAGMENTS

Figure 5:
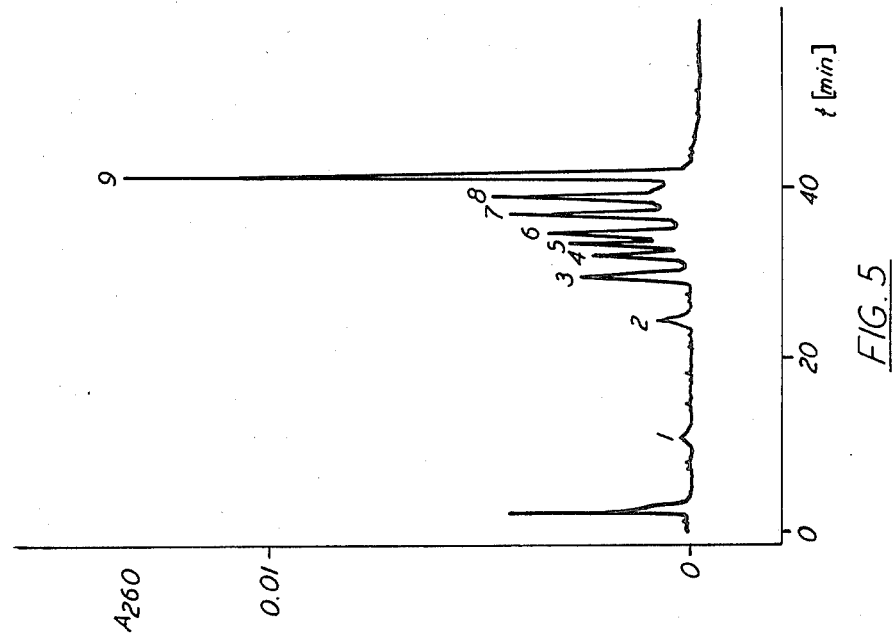

Chromatography of high molecular weight DNA restriction fragments was carried out using the anion-exchange resin obtained in Example 1 (FIG. 5). The DNA fragments were obtained by digestion of pBR 322 plasmid DNA with Hinf 1 yielding following sizes: 75, 154, 220, 298, 344, 396, 506, 517 and 1631 basepairs, respectively. It is remarkable that even the 506 and 517 basepair fragments could be separated from each other.

Column: 6 mm × 125 mm stainless steel, elution with a linear gradient from 700 mM to 1200 mM KCl in 100 min, in 5 M urea, 30 mM potassium-phosphate buffer, pH 6.5, flow rate 1 ml/min, 35 bar 22° C.

EXAMPLE 6—PLASMID DNA FROM CRUDE CELL LYSATE

Figure 6:
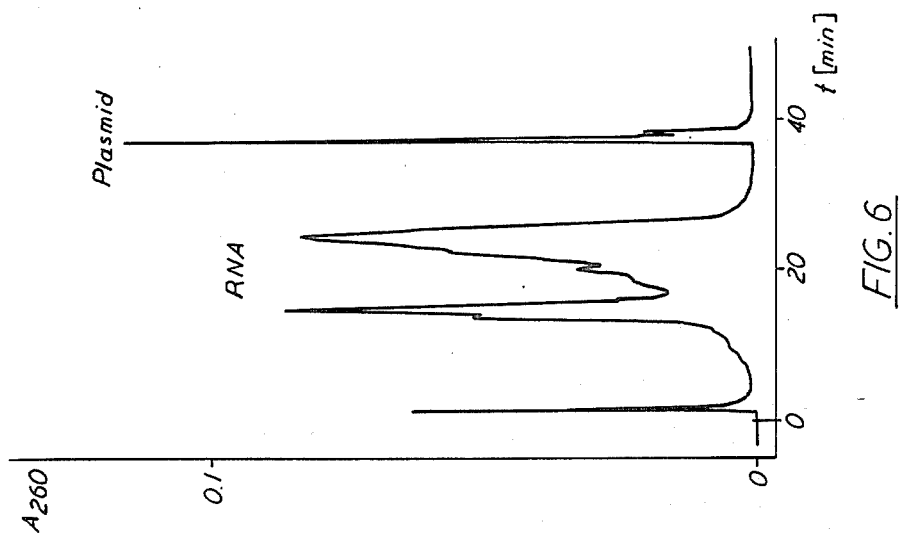

Purification of 50 μg plasmid pBR 322 DNA from crude cell lysate prepared by the lysozyme/EDTA method (D. B. Clewell and D. R. Hellinsky, proceedings of the National Academy of Sciences, USA (1969), 62, 1159-1166) was carried out using the anion-exchange resin obtained in Example 1 (FIG. 6). Column: 6 mm×125 stainless steel, elution with a linear gradient from 300 mM to 1500 mM KCl in 50 min, in 5 M urea, 30 mM potassium-phosphate buffer, Ph 6.5, flow rate 1.5 ml/min, 45 bar, 22° C.

Various changes may be made in the foregoing process without departing from the spirit and scope of the present invention.

We claim:

1. A process for the chromatographic separation of nucleic acids using a chromatographic carrier prepared by reacting a porous carrier material that contains cavities with a silanization material, wherein said porous carrier material has a grain size of from 2 to 100 μm, a cavity size cross section of 1 to 40 times the maximum dimension of the nucleic acids contained in the mixture and a specific surface of from 5 to 800 m²/g, and said carrier material is reacted with a silanization reagent of the general formula $$R_1R_2R_3SiR_4 \qquad \text{I.}$$

wherein $R_1$ is selected from the group consisting of an alkoxy radical having from 1 to 10 C atoms, a halogen group, and a dialkyl amino group with identical or different alkyl radicals having from 1 to 6 C atoms, $R_2$ and $R_3$ each are selected from the group consisting of a hydrocarbon radical having from 1 to 10 C atoms, an alkoxy radical having from 1 to 10 C atoms, a halogen atom, an alkyl radical having from 4 to 20 C atoms interrupted by at least one oxy or amino group, and at least one halogen, cyano, nitro, amino, monoalkylamino, dialkylamino, hydroxy or aryl group, and $R_4$ is selected from the group consisting of a hydrocarbon chain having from 1 to 20 C atoms and an alkyl radical interrupted by at least one oxy or amino group, or at least one halogen, cyano, nitro, amino, monalkylamino, dialkylamino, alkoxy, hydroxy, aryl and/or epoxy group, and then, reacting the resulting carrier material with a reagent of the general formula $$X\text{-}R\text{-}Y \qquad \text{II}$$

wherein X is selected from the group consisting of an amino, hydroxy, and an epoxy group and, a halogen atom, R is selected from the group consisting of a hydrocarbon chain having from 2 to 20 C atoms, and an alkyl radical interrupted by at least one oxy or amino group, or at least one halogen, cyano, nitro, amino, monoalkylamino, dialkylamino, alkoxy, hydroxy, aryl and/or epoxy group and Y is selected from the group consisting of a hydrocarbon radical having from 1 to 10 C atoms and functional groups that form anion or cation exchangers, wherein said radical can be replaced once or more by amino, monoalkylamino, dialkylamino, quaternary alkylamino, carboxyl, boric acid, alkyl and aryl sulfonic acid groups.

2. A process according to claim 1, wherein the carrier material has a cavity size of from 50 to 1000 μm and a specific surface of at most 200 m²/g.

3. A process according to claim 1, wherein said carrier material comprises silicon dioxide.

4. A process according to claim 1, wherein the diameter of the cavities amounts to from 1 to 20 times the maximum dimension of the respective nucleic acid to be isolated or the maximum dimension of the largest of all nucleic acids contained in the mixture.

5. A process according to claim 1, wherein the cavities comprise semispherical recesses.

6. A process according to claim 1, wherein the cavities are tubular in cross section.

7. A process according to claim 1, wherein $R_1$ comprises an alkoxy radical selected from the group consisting of —OCH₃, —OC₂H₅ and —OC₃H₇.

8. A process according to claim 1, wherein $R_1$ comprises a chlorine group.

9. A process according to claim 1, wherein $R_2$ and $R_3$ each comprise a hydrocarbon radical selected from the group consisting of —CH₃, —C₂H₅ and —C₃H₇.

10. A method according to claim 1, wherein $R_2$ and $R_3$ each comprise an alkoxy radical selected from the group consisting of —OCH₃, —OC₂H₅ and —OC₃H₇.

11. A process according to claim 1, wherein $R_4$ comprises an alkyl radical replaced by an epoxy group consisting of alkoxy, hydroxy, aryl and/or epoxy group.

12. A process according to claim 11, wherein said epoxy group comprises.

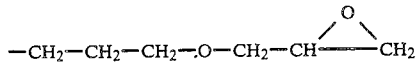

13. A process according to claim 11, wherein the solution containing nucleic acids to be separated and the elution substance are kept free from bivalent metal ions by using noble metal, glass and/or plastic for columns, pipes, valves and pumps of the chromatographic equipment.

* * * * *

UNITED STATES PATENT AND TRADEMARK OFFICE
CERTIFICATE OF CORRECTION

PATENT NO. : 4,699,717
DATED : October 13, 1987
INVENTOR(S) : Detlev RIESNER & Metin COLPAN It is certified that error appears in the above—identified patent and that said Letters Patent is hereby corrected as shown below:

Claim 2, Column 8, Line 13 - change "µm" to "nm".

Signed and Sealed this

Twenty-first Day of August, 1990

Attest:

HARRY F. MANBECK, JR.

*Attesting Officer*          *Commissioner of Patents and Trademarks*